Patented Mar. 28, 1939

2,152,505

UNITED STATES PATENT OFFICE 2,152,505

REVERSIBLE SEAT AND SQUAB

James Kingston Stuart, Somerton, South Australia, Valentine Wilfred Stacey, Henley Beach, South Australia, and Thomas Alva Wylie, Ridleyton, South Australia, Australia, assignors, by mesne assignments, to General Motors Corporation, Detroit, Mich., a corporation of Delaware Application August 5, 1935, Serial No. 34,826
In Australia May 1, 1935

8 Claims. (Cl. 155—7)

This invention consists in rear seat and squab equipment for automobiles, disposable in either of two positions thereby to enable use of the rear body space for the accommodation of passengers or for the carrying of freight or baggage as may be required.

The rear seat cushion and the rear seat squab are pivotally supported for swinging movement about longitudinally spaced transversely extending axes; they are coupled by linkage which controls their tilting movement in unison and checks them in either position of adjustment.

In the change over from seating position to freight or baggage carrying position, the rear seat cushion is swung upward and forward and then downward to a vertical position on its pivot supports which are centered under the forward part of it, and the back rest or squab is swung downward to horizontal position on its pivot supports which are centred behind its lower edge. Reverse movement of the seat cushion and squab restores them to the seating position. In either position there exists an off center relation of both the seat and the squab with respect to their axes of swinging movement which is favorable to the retention of the parts by reason of their mere weight against displacement from adjusted position. The interconnection or motion transmitting linkage between the cushions serves to combine the resistance of both for action against either horizontal or vertical forces, such as might tend to displace individual cushions of the angularly related pair from the substantially vertical and horizontal planes alternately occupied.

The body space rearward of the back squab is false floored and is enclosed frontally by the back squab when the squab is in the erect or seating position; the space is, however, accessible for the placing of baggage in it or for the removal of baggage from it through a rear door, or when the seat squab is tilted forward. In the freight carrying disposition, the back of the downtilted squab is in plane with this false floor, and the back of the tilted seat cushion forms a barrier which prevents the freight from coming in contact with the back of the front seat squab. The backs of the tiltable cushion and squab are protected by wood or metal lathing or sheeting. Stowage space for tires is available, if the body design permits, between a floor fixed on the chassis frame or forming the body bottom, and the false floor above-mentioned; this stowage space is accessible through a rear door in the body back. Shield wings are fixed on the squab back near its side edges to protect the upholstery on the sides of the car body from injury by freight or luggage; these wings are hidden in the rear space when the parts are disposed for passenger carrying; when the parts are disposed for the carrying of luggage or freight they stand erect close to the side upholstery.

The accompanying drawing is explanatory of the invention.

A is the floor line of the car body, and B is the rear part of a sedan type body with conventional air-flow back end C. D is the false floor, and E is the tire stowing space under the floor D. An outwardly opening door (not shown) offers access to the space E. F is the front seat cushion and G the front seat squab. H is a frame bar against which the back of the rear seat squab J rests when it is in the seating position, and K is a buckle latch for locking the squab J in that position.

Figure 1:
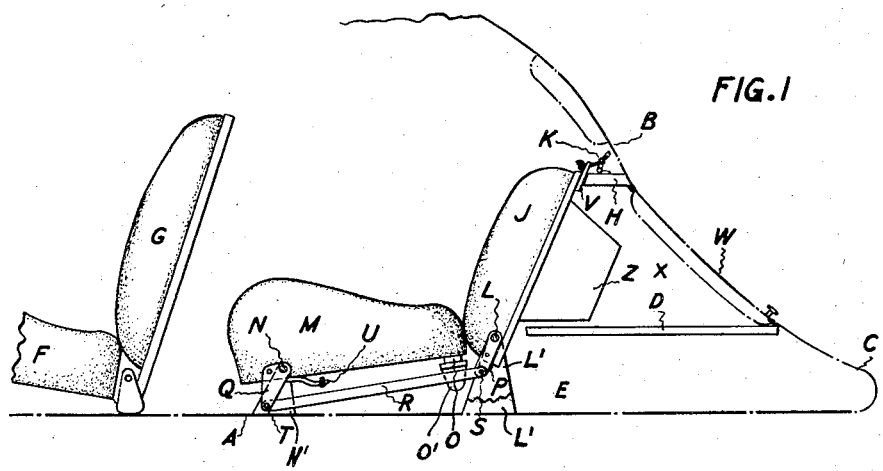
Fig. 1 is an interior longitudinal sectional view showing the rear seat cushion and squab in the seating position.
Figure 2:
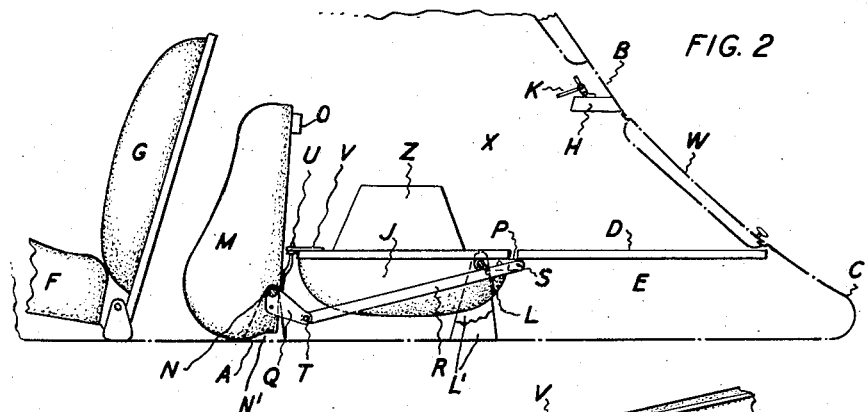
Fig. 2 is a similar view showing those members in the freight carrying position.

The rear seat squab J is centered on pivots L located near the lower edge thereof and mounted in brackets L' on the body frame at each side of the car and is tiltable on these pivots from the erect passenger accommodating position shown in Figure 1 to the horizontal platform extension position shown in Figure 2 and vice versa. The rear seat cushion M is centered on pivots N located near the front bottom edge of the cushion in longitudinally spaced relation with the pivots L and mounted in brackets N' on the body frame at each side of the car. The pivotal mounting enables the seat cushion to be swung between passenger seating position shown in Figure 1 in which lateral lugs O at the rear rest on angle brackets O' or the like fixed to the body frame at each side of the car and the luggage loading position of Figure 2 wherein the rear face of the cushion defines the forward limit of the loading space. In the passenger seating position the major portion of each cushion is offset rearwardly from the vertical plane containing its pivotal axis while in the luggage loading position the off center relation is forward of the respective axes and, therefore, the weight of the cushions tends in itself to keep them from swinging away from either position.

Figure 3:
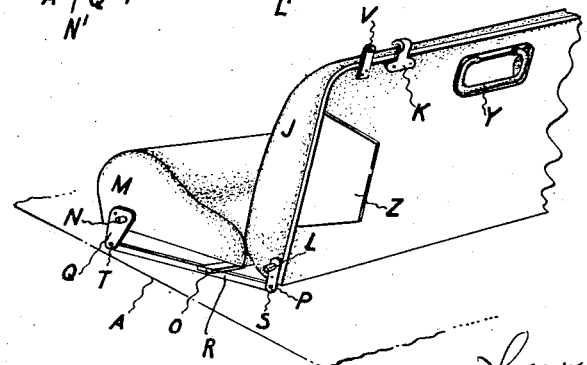
Fig. 3 is a fragmentary perspective view of the same members in the seating position.

A bracket P is fixed on each side edge of the squab J and a bracket Q is fixed on each side edge of the cushion M, and these brackets on the respective sides of the structure are connected by links R which are articulated to them by pivot pins S and T in slightly spaced relation with the pivot pins L and N. This interconnection of the separately pivoted seat and back transmits motion between the cushions for their unisonal swinging adjustment and promotes ease of manipulation. U is a projecting stud on the underside of the seat M and is provided for engagement with a staple V on the squab back to lock the cushion in the upright position (Fig. 2) and to support the forward edge of the squab J when the parts are arranged for the carrying of freight or baggage. W is a rear door for access from without to the freight or luggage space X as seen in Fig. 2. The pivot centres L are appropriately positioned to align the back of the squab J level with the false floor D when the squab is tilted down (Fig. 2). The backs of the cushion M and squab J are sheeted or slatted with wood or metal to protect them from injury by freight or baggage which is being carried in the space X. Y is a countersunk hand grip for facilitating lifting of the squab in restoring it to its upright position (Figs. 1 and 3). Z are shield wings fixed on the squab back at or near its side edges to provide protection for the side upholstery when the squab is set down as in Fig. 2.

In the case of automobiles with coupé bodies, substantially the same arrangement is used. In this case the rear top part of the body is built low and designed to be swung backward in the usual way to open the rumble compartment, and the seat and squab are tilted forward (as in Fig. 2) to accommodate freight or baggage, or tilted back (as in Fig. 1) to accommodate passengers.

The arrangement would be operative but more or less unsatisfactory if the articulating link were omitted.

What we claim as our invention and desire to secure by Letters Patent is:

1. In a motor vehicle having loading space for either luggage or passengers, a pair of members adapted when in one angularly related position to constitute a seat and back and when in another angularly related position to constitute horizontal and vertical walls respectively of a luggage compartment, means near an edge of one of the members for pivotally mounting the same on a fixed transverse axis, other means pivotally mounting the other of said members near an edge thereof on a fixed axis in longitudinally spaced parallelism to the first mentioned axis, said mounting means being so constructed and arranged that the free edges of said members travel through intersecting paths upon swinging movement of the members between said angularly related positions and means to compel unison swinging movement of the members comprising an interconnecting link pivotally joined at opposite ends to both members.

2. In a motor vehicle body, a luggage platform enclosed within the body at the rear thereof, a squab and a seat positioned within the body forward of said platform, means carried by the body and pivotally mounting the squab near its lower end for forward swinging movement into horizontal alinement with the platform to constitute a continuation thereof, means carried by the body and pivotally mounting the forward portion of the seat for swinging movement into an upright position forward of the lowered squab, lever arms rigid with the seat and squab, respectively, and a motion transmitting link pivotally secured at opposite ends to said lever arms on axes spaced from the pivotal axes of the seat and squab for insuring seat and squab unisonal swinging movements.

3. In an automobile body, a rear wall luggage loading door, enclosed luggage receiving space having a floor extending forwardly from said door, a squab extending upright adjacent the forward edge of the floor, means pivotally supporting the squab at its lower end for swinging movement into horizontal alinement with the floor to constitute a continuation thereof, a seat cooperating with the upright squab for passenger accommodation, and means pivotally mounting the seat near its forward edge for swinging motion to an upright position in which it affords a vertical barrier defining the forward limit of the loading space afforded by the floor and squab continuation thereof.

4. In a motor vehicle body, a rear wall having a loading opening, a false floor comprising a pair of horizontally alined sections enclosed within the body and projected forwardly from the opening, means at the adjacent edges of the floor sections pivotally mounting the foremost floor section for upward swinging movement into an erect position to constitute a seat back, means mounting the rearmost floor section adjacent said rear wall loading opening to define a spare tire compartment below and a luggage compartment above said floor section in either position of the pivoted floor section, an upstanding barrier at the forward edge of the alined floor sections defining the maximum limit of loading space, and means pivotally mounting the upstanding barrier for rearward swinging movement into cooperative position with the pivoted floor section in providing a seat.

5. In an automobile body, a forwardly and upwardly tiltable seat, a forwardly and downwardly tiltable back rest, means pivotally mounting the seat and the back rest for their respective tilting movement about spaced parallel axes whereby the front edge of the downwardly tilted back rest is positioned beside the rear face of the upwardly tilted seat and a catch to hold the seat and back rest in their forwardly tilted positions including a stud and a stud engaging staple carried, respectively, by adjacent portions of the seat and the back rest.

6. In an automobile body having spaced side walls, a seat back rest positioned between said walls, means pivotally mounting the back rest near its lower edge on a transverse axis for forward and downward swinging movement from an upright position to a horizontal position in the latter of which it provides a luggage carrying platform, and rearwardly projecting wings carried by the back rest at each side thereof and adapted to extend in protective relation to the body side walls and to define side wall limits of the luggage loading platform provided by the rear face of the downturned back rest.

7. In a motor vehicle having loading space for either passengers or luggage, cooperating seat and back sections in said space for passenger accommodation, means pivotally mounting the seat section near its forward end for swinging movement into an upright position to define a vertical wall of a luggage receiving compartment, means pivotally mounting the back section near its lower end for downward swinging movement into space normally occupied by the seat section to define the loading platform of the luggage receiving compartment and motion transmitting linkage interconnecting said sections for their swinging movement in unison through intersecting paths between their respective upright and prone positions.

8. In an automobile body, a rearwardly disposed storage compartment contained within the body, a seat back rest extending upwardly in front of the compartment to define the forward limit thereof, means pivotally mounting the back rest near its lower edge for forward swinging movement to shift the position of the forward limit of the compartment, and side wall protecting wings carried by the seat back at opposite sides thereof to project beside and in protective relation to the walls in the forward position of the seat back and to be housed within the storage compartment in the upright position of the seat.

JAMES KINGSTON STUART.
VALENTINE WILFRED STACEY.
THOMAS ALVA WYLIE.